Dec. 18, 1962   J. O. HELVERN ET AL   3,068,843
BRAKE BOOSTER UNIT
Filed July 29, 1960   2 Sheets-Sheet 1

INVENTORS.
James O. Helvern
Clarence R. Wuellner
BY
Their Attorney

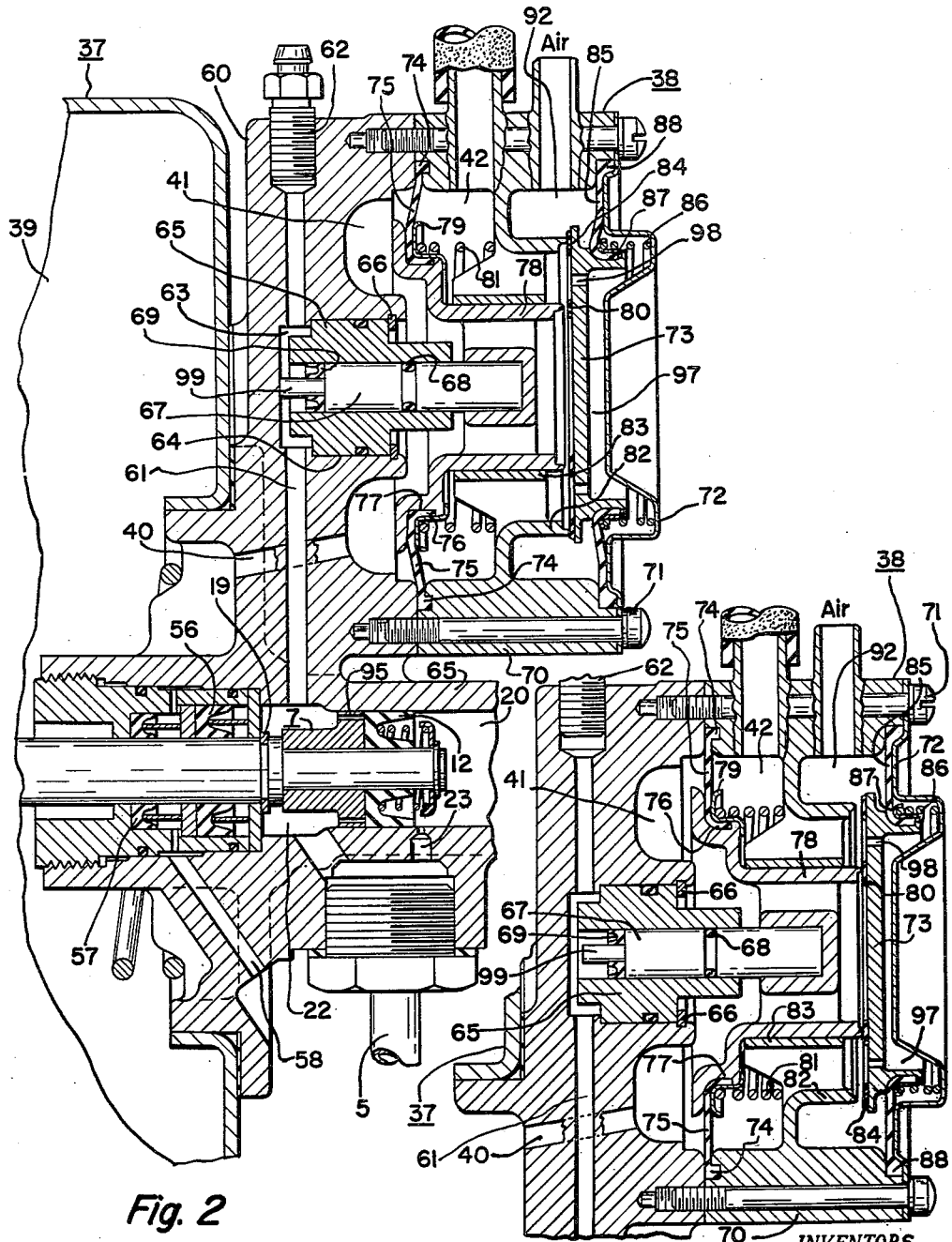

United States Patent Office 3,068,843
Patented Dec. 18, 1962

3,068,843
BRAKE BOOSTER UNIT
James O. Helvern, Lewisburg, and Clarence R. Wuellner, Dayton, Ohio, assignors to General Motors Corporation, Detroit, Mich., a corporation of Delaware
Filed July 29, 1960, Ser. No. 46,123
3 Claims. (Cl. 121—46.5)

This invention relates to a booster unit and more particularly to a reaction means in combination with a booster unit.

During the operation of the vehicle brakes, it is important that the operator have some indication as to the degree of force being applied on the vehicle brakes. This force is transmitted to the manually operated pedal which controls the operation of the vehicle brakes. In a booster unit, such as the type described in this patent application, a remote manually operated master cylinder is employed to control the power master cylinder and the booster unit through a valve mechanism. It follows, that the force being transmitted to the brake pedal must be transmitted through a fluid medium to the booster control valves which control the booster unit.

Accordingly, this invention is intended to provide a portion of the reaction from the pressurization of the fluid within the power master cylinder and also a portion of the reaction being transmitted in response to the differential pressures within the booster unit. The differential expansible fluid pressures create a reaction force in direct relationship to the increase fluid in the power master cylinder to provide a reaction force for the feel transmitted to the operator of the vehicle brakes. The force is transmitted from the hydraulic fluid for actuating the brakes and the expansible fluid for operating the booster unit. The feel is in direct proportion to the actuation of the vehicle brakes.

It is an object of this invention to provide in an expansible fluid brake booster unit a combination reaction means derived from the pressurized fluid in the power master cylinder and a reaction derived from a pressure equal to the differential of expansible fluid pressures in the booster unit.

It is another object of this invention to provide a reaction means in direct response to the increased pressurization in the power master cylinder for operation of the power master brakes.

It is a further object of this invention to provide a reaction force to the manually controlled operating means in direct relationship to the increased pressure in actuation of the vehicle brakes and also the increased pressure of the modulated air for actuation of the booster unit.

It is a further object of this invention to provide concentric valves operating a booster unit against a valve seat member having an equalizing pressure chamber in communication with air modulating chamber in the valve means.

It is a further object of this invention to provide concentric vacuum and air valves for operating on the common seat member biased to a contacting position with said vacuum and air valves and having an equalized air chamber on axially opposite ends of said valve seat member.

It is a further object of this invention to provide a valve piston operating a vacuum valve against expansible fluid in a modulated air chamber to provide a reaction means created by the expansible fluid in a direct proportion to the increased pressure of expansible fluid for operating pressure the booster unit.

The objects of this invention are accomplished by employing a remote manually operated hydraulic master cylinder in communication with a power operated hydraulic master cylinder. A booster unit having a valve means is connected to a power master piston which operates within the power master cylinder. The valve means are operated by the valve piston in communication with the power master cylinder and the manually operated master cylinder. The valve piston operates a movable diaphragm supported vacuum valve against a diaphragm supported vacuum and air valve seat member. The modulated air chamber is in communication with an auxiliary modulated air chamber on the opposing side of the valve seat. The modulated air pressure provides a reaction force in direct proportion to the increased pressure in the modulated air chambers which are in communication with the variable pressure chamber in the booster unit.

The reaction force transmitted to the manually operated hydraulic master cylinder is in direct proportion to the pressurization of fluid within the power operated master cylinder and the increased pressure in the modulated air chamber which in turn is in communication with the booster unit. The passage of the modulated air in the modulated air chamber in the valve means to the auxiliary modulated air chamber is directed toward an equalization of pressure on opposing sides of the valve seat member when the vacuum valve is closed. The modulated air creates a force on the vacuum valve diaphragm, the vacuum valve, and valve seat member in direct response to the increase pressure in the modulated air chamber and the auxiliary chamber which transmits a reaction force to the valve piston.

Further objects and advantages of the present invention will be apparent from the following description, reference being had to the accompanying drawings wherein preferred embodiments of the present invention are clearly shown.

In the drawings:

FIGURE 2 is a cross-section view of a portion of the master cylinder and of the valve mechanism in the normally retracted position.

FIGURE 3 is a cross section view of the valve mechanism in the normally operative position with the vacuum valve closed and the air valve open.

Figure 1:
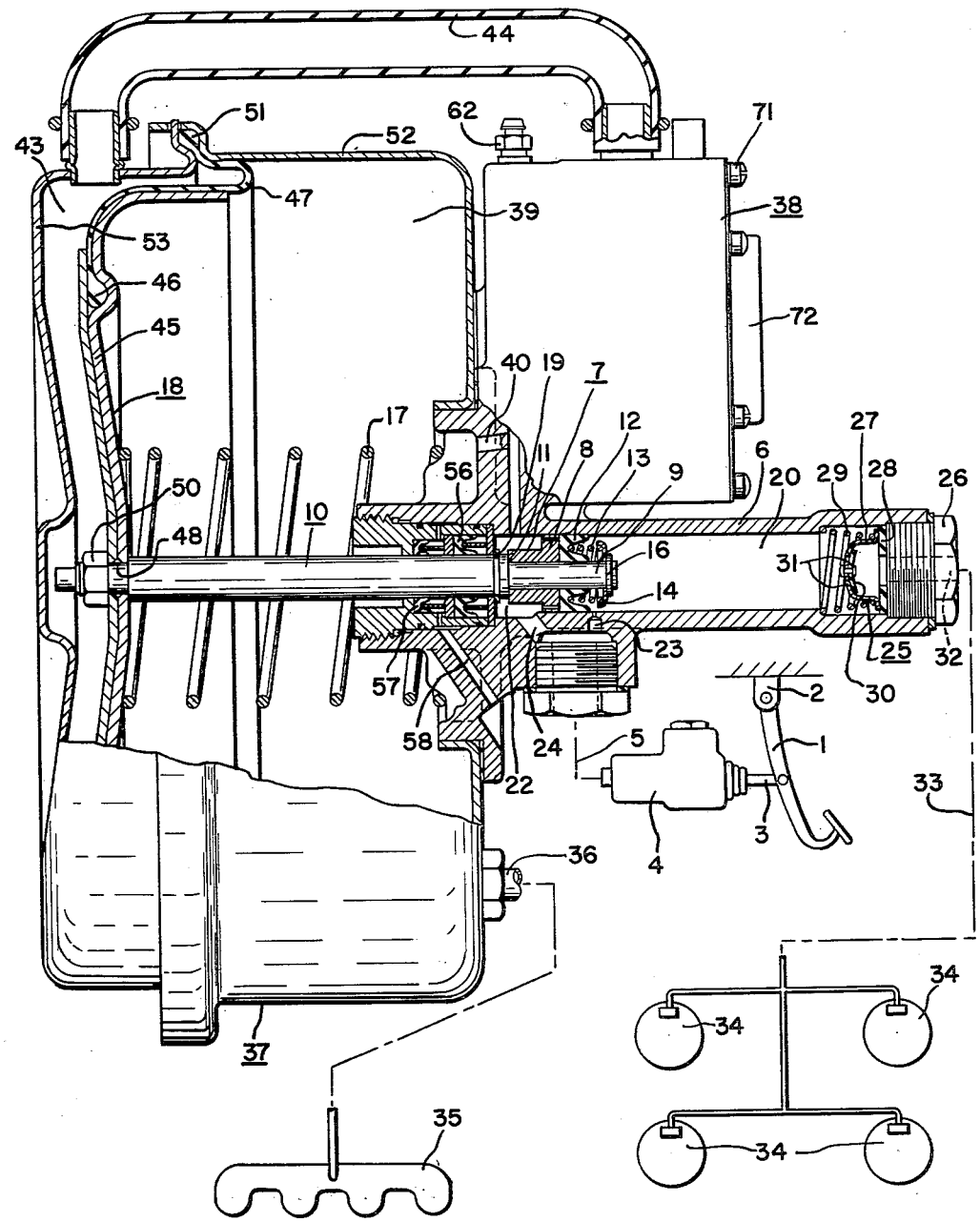
FIGURE 1 is a schematic view of the remotely operated booster unit with a portion of the booster unit broken away to clarify portions of the unit.

The booster unit is designed to operate in response to a manually operated master cylinder located remotely from the booster unit. A fluid connection places the power master cylinder in communication with the remote manually operated master cylinder. The power operated master cylinder contains a piston forming a chamber on the rearward side which is also in communication with the manually operated master cylinder and a valve cylinder having a valve piston. Normal operation of the unit operates the power piston in direct response to pressurization in the remote master cylinder and power operation in response to the booster unit.

The booster unit has provisions for manual operations in the event of power failure. This operation is directly from the manually operated master cylinder through a seal valve in the forward end of the power piston and a vent leading forward of the master piston in its retracted position. This operation, in the event of power failure, provides for movement of fluid around the power piston to pressurize fluid within the power master cylinder and actuate the vehicle brakes.

Referring to FIGURE 1, the booster unit is disclosed with the relating parts shown in schematic connection with the booster unit. The brake pedal 1 is pivotally mounted on the chassis 2 and pivotally connected to a push rod 3 to pressurize fluid within the manually operated master cylinder 4. The manually operated master cylinder 4 has a conduit 5 which is in communication with a power operated master cylinder 6.

The power master cylinder 6 receives a master piston 7 constructed of the sleeve 8 received on the reduced diameter portion 9 on the forward end of the power rod 10. The sleeve 8 abuts a shoulder 11 on the power rod 10. A seal 12 engages the forward facing of the sleeve 8 and is retained in this position by the spring 13. The spring 13 engages the spring seat 14 and is maintained in its position by the snap ring 16.

A power rod 10 is retracted by means of the spring 17 operating against the power wall 18 and carries a snap ring 19 to limit the retracted position for the rod 10.

The power piston 7 separates the interior of the power cylinder 6 into a pressurizing chamber 20 and a follow-up chamber 22. The pressurizing chamber 20 is in communication with the conduit 5 through the venting passage 23. The follow-up chamber 22 is in communication with the conduit 5 through the passage 24.

The power master cylinder 6 receives a check valve assembly 25 in its forward end. The check valve assembly 25 seats on the fitting 26 and includes the hat-shaped shell 27 seated on an annulus 28 and biased through this contacting position by means of the spring 29. The hat-shaped shell 27 receives the valve element 30 which operates in closing the plurality of openings 31.

The outlet port 32 feeds into the conduit 33 to the plurality of vehicle brakes 34.

The engine manifold 35 provides a source of vacuum to operate the booster unit. The manifold 35 is connected by means of a conduit 36 to a power unit 37. The power unit 37 is operated through the valve means 38.

The booster unit 37 is vacuum suspended. The source of vacuum 35 evacuates the chamber 39 on the forward side of the power wall 18. The vacuum chamber 39 is connected by the passage 40 to the vacuum chamber 41 in the valve means as shown in FIGS. 2 and 3. The vacuum valve is open in the normally retracted position thereby placing the modulated air chamber 42 in communication with the rearward chamber 43 in the booster unit 37. The chamber 43 contains vacuum when the power wall 18 is in its normally retracted position. The external conduit 44 places the variable pressure chamber 43 in communication with the modulated air chamber 42 of the valve means.

The booster unit 37 contains the power wall 18 having a central rigid support 45 containing the radial inner bead 46 of the diaphragm 47. The rigid support 45 has a central perforation 48 for receiving the rearward end of the push rod 10 which is fastened by means of the nut 50. The radially outer portion of the diaphragm 47 forms a bead 51 which is received between the forward section 52 of the casing and the rearward section 53 of the casing of the booster unit 37.

The vacuum chamber 39 in the booster unit 37 is sealed from the follow-up chamber 22 for hydraulic fluid through the double seal assembly. The double seal assembly includes the fluid seal 56 and the vacuum seal 57. A vent 58 to atmosphere leads to a point between the seal assembly 56 and 57. In the event of leakage of the forward seal 56, the vent 58 prevents fluid from entering the vacuum unit. The power master cylinder 6 is formed in the unitary casting which is mounted on the forward side of the casing for the booster unit 37. The casting forming the power cylinder 6 also provides a support for the valve assembly 38.

Referring to FIGURE 2, a master cylinder 6 is shown mounted on the forward side of the booster unit 37. The upper portion of the casting forming the master cylinder provides the supporting wall 60 for the valve means 38. The passage 61 is in communication with the follow-up chamber 22. The passage 61 leads vertically to the point where the end of the passage forms a valve seat for the fitting 62. A fitting 62 includes a nut which is provided for bleeding of the fluid system.

Intermediate in the passage 61 is formed an enlarged chamber 63 to accommodate the valve cylinder 64 for operating the valve means.

The valve means 38 includes the cylindrical chamber 64 formed in the casting 60. The valve operating cylinder 65 is positioned in a cylindrical chamber 64 and receives a seal in a recess in its outer periphery. The snap ring 66 retains the valve operating cylinder 65 in its position within the casting 60. The auxiliary valve piston 67 operates within the auxiliary valve cylinder 65. A seal 68 is positioned in an annular recess about the outer periphery of the valve piston 67. On the rearward end of the valve piston 67, the primary seal 69 is positioned on the piston. The rearwardly extending stem 99 provides a stop for the auxiliary piston through the valve piston 67 in its rearward or retracted position as it abuts the wall 60 of the main casting. The valve housing 70 encloses the valve means and is fastened to the wall 60 by means of a plurality of bolts 71. The bolts fasten the cover plate 72 which encloses the valve seat member 73. The valve housing 70 receives the bead 74 on the outer periphery of the vacuum valve diaphragm 75. The inner periphery of the vacuum valve diaphragm is provided with an axial flange 76 which is received within the recess 77, in the outer periphery of the vacuum valve 78 and retained by the spring seat 79. The vacuum valve element 78 is in this manner permitted to move axially as the vacuum valve diaphragm 75 flexes. The vacuum valve element 78 is biased to a rearward position in spaced relation to the vacuum valve seat 80 by the biasing force of the vacuum valve spring 81. The opposite end of the vacuum valve spring is seated on the air valve element 82 which is a portion of the valve housing 70.

The valve housing 70 forms the air valve 82 on its radially inner portion. The sleeve 83 formed in the inner periphery of the air valve forms a means of aligning the vacuum valve element 78 with the air valve 82. The air valve 82 normally engages the air valve seat 84 when the vacuum valve element 78 is in its normally retracted position. The valve-seat member 73 is biased away from the cover plate 72 by means of the valve seat member spring 86. The valve seat member spring 86 is received within an annular recess in the cover plate 72 and contacts a spring retainer 87 which seats the inner periphery of the valve seat diaphragm 85 on the valve member 73. The outer periphery of the valve seat diaphragm 85 has an annular bead 88d which is received between the cover plate 72 and the valve housing 70. The valve seat member 73 is permitted to move axially as the valve seat diaphragm 85 flexes.

The spring 86 biases the valve seat member 73 to a contacting position on the air valve element 82. The air valve seat 84 is formed by an annulus bonded to the planar surface on the valve seat member 73. A concentric annulus 80 forms the vacuum valve seat to engage the vacuum valve element 78 when the vacuum valve is closed.

FIGURE 3 shows the air valve in the open position. This permits communication between the air valve chamber 92 and the modulated air chamber 42 when the booster unit is in the operating position.

The booster unit operates in the following described manner. As the brake pedal 1 is depressed, the fluid in the manually operated master cylinder 4 is pressurized. This in turn pressurizes fluid in the conduit 5 and the pressurizing chamber 20 of the power master cylinder 6 and the follow-up chamber 22 in the power master cylinder 6. The pressure in the pressurizing chamber 20 of the power master cylinder 6 increases as the fluid passes through the venting port 23 and the axial passages 95 in the power master piston. The fluid passes about the outer periphery of the seal 8 thereby increasing the pressure within the pressurizing chamber 20 and forcing fluid through the check valve assembly 25 into the wheel cylinders in the plurality of vehicle brakes 34.

The increase in pressure within the follow-up chamber 22 also increases the pressure within the valve cylinder 65 and in the pressurizing chamber 63. The pressure also increases on the rearward side of the valve piston 67.

In the normally retracted position, the vacuum valve element 78 is in spaced relation to the vacuum valve seat 80. The valve seat member 73 carrying the air valve seat 84 and the vacuum valve seat 80 is normally biased into a contacting position of the air valve seat 84 with the air valve element 82. In this position, there is communication between the modulated air chamber 42 and the vacuum chamber 41 placing communication between the vacuum chamber 41 and the variable pressure chamber 43 of the booster unit 37 through the conduit 44.

In the retracted position, the power wall 18 is biased to a rearward position by the spring 17. With an increase in pressure from the manually operated master cylinder 4, the pressure also increases within the chamber 63 in the valve cylinder 65. Pressurized fluid in chamber 63 biases the valve piston 67 to move forwardly carrying the vacuum valve element 78 to contact the vacuum valve seat 80 carried on the valve seat member 73. In this position, no communication is present between the vacuum chamber 41 in the valve means and the modulated air chamber 42. There is no communication between the modulated air chamber 42 and the air chamber 92 in the valve means.

With a further increase in pressure in the chamber 63, the valve piston 67 moves forwardly to unseat the air valve seat 84 from the air valve element 82 thereby placing the air chamber 92 and the modulated air chamber 42 in communication with each other. This in turn increases the pressure within the modulated air chamber 42 and the variable pressure chamber 43 through the conduit 44 of the booster unit 37. As the pressure increases behind the power wall 18, the power wall moves forward carrying the power wall 18 forwardly pressurizing fluid within the pressurizing chamber 20 within the power master cylinder. The pressure and volume within the follow-up chamber 22 increases as the power piston 7 moves forwardly within the power master cylinder 6. With the forward movement of the power piston 7, the venting passage 23 is closed and the axial passages 95 in the power piston 7 are also closed as the seal 12 seats firmly on the forward facing of the sleeve 8.

Prior to actuation of the valve means, a sole reaction force to the manually operated master cylinder 4 was derived from the pressure within the follow-up chamber on the rearward side of the power piston 7 in the power cylinder 6. With an operation of the valve means 8, an increase in pressure is realized within the modulated air chamber 42. The increase in pressure in the modulated air chamber 42 creates a force on the forward wall of the vacuum valve diaphragm 75, the vacuum valve element 78 and valve seat member 73. This in turn creates a force on the forward side of the valve piston 67 which transmits a force to the fluid chamber 63 within the valve cylinder 65. With an increase in the pressure in the modulated air chamber 42, a direct increase is realized on the valve piston 67 which in turn is transmitted through the fluid means to the manually operated master cylinder 4.

At this point, it is noted that the pressure within the auxiliary modulated air chamber 97 is always equalized through the axial passages 98 and the valve seat 73. Prior to opening of the air valve, a vacuum is present in the auxiliary modulated air chamber 97 as well as in the modulated air chamber 42. As the vacuum valve closes and the air valve opens, the change in pressure within the modulated air chamber 42 of the valve means 38 increases and the auxiliary modulated air chamber 97 forward of the valve seat member also equalizes through the plurality of axial passages 98. This provides a free, unobstructed movement of the valve seat element 73 in response to the spring 86.

With the closing of the vacuum valve element 78 with the vacuum valve seat 80 and the opening of the air valve seat 84 from the air valve element 82, the pressure in the modulated air chamber 42 increases. This in turn increases the pressure within the auxiliary modulated air chamber 97 which increases the pressure on the forward facing of the valve seat member 73. With an increase in pressure within the modulated air chamber 42 and on the forward facing of the vacuum valve seat member 73, a biasing force is created on the forward side of the valve seat member 73. This force is transmitted through the valve piston 67 to the fluid chamber 63 and the fluid means to the manually operated master cylinder 4. In addition to this expansible fluid reaction transmitted through the fluid means, the additional back pressure created by the pressurized fluid within the pressurizing chamber 20 of the power master cylinder 6 is also transmitted through the power piston 7.

Further pressurization of fluid within the manually operated master cylinder 4 increases the pressure within the pressurizing chamber 20 of the power master cylinder 6 and also increases pressure within the modulated air chamber 42 and the auxiliary modulated air chamber 97, creating an increased reaction means in direct proportion to the increased pressure for operating the vehicle brakes.

As the brake pedal 1 is released, the pressurization of the fluid within the manually operated master cylinder 4 also decreases thereby decreasing the fluid pressure behind the power master piston and the valve piston 67, permitting retraction of the valve piston 67. The valve piston 67 moves rearwardly again seating the air valve seat 84 on the air valve element 82 while the vacuum valve seat 80 remains seated on the vacuum valve element 78. This is the hold position for the booster unit and the reaction force is still from the pressurized fluid within the follow-up chamber 22 of the power master cylinder 6 and the pressurization of expansible fluid in the modulated air chamber 42 in the auxiliary modulated air chamber 97.

A further release of the brakes permits the vacuum valve to open which in turn evacuates the modulated air chamber 42 and the auxiliary modulated air chamber 97 thereby decreasing the reaction force transmitted to the valve piston 67. With a decrease in pressure in the variable pressure chamber 43 of the booster unit, the power piston 7 is permitted to return decreasing the volume in the follow-up chamber 22. This in turn permits a rearward movement of fluid through the port 32 on the forward end of the power master cylinder 6 and a decrease in the pressurizing chamber 20 of the power master cylinder 6. Accordingly, a decrease in the reaction force in the follow-up chamber 22 is also realized as well as within the chamber 63 of the valve piston 67 of the valve cylinder 65.

As the pressure in the modulated air chamber 42 decreases, the reaction force on the valve piston 67 also decreases accordingly. When a vacuum again is present within the modulated air chamber 42 and the auxiliary modulated air chamber 97, no reaction force is realized from the valve piston 67. At this point, the sole reaction force is then transmitted from a follow-up chamber 22 of the power master cylinder 6. The force of the retraction spring 17 biases the power wall 18 of the booster unit 37 to its rearwardly retracted position. With a further release of the brake pedal 1, the pressurization of the fluid within the manually operated master cylinder 4 decreases to atmospheric pressure and the brakes are again in the normally retracted position. With the valve means in the retracted position, the vacuum valve is open and the air valve is closed and the booster unit is in its retracted position.

What is claimed is as follows:

1. In a brake booster unit having a power operated hydraulic fluid displacement means for brake actuation connected with a power wall in said power unit that divides the interior of said booster unit into a generally constant pressure chamber and a variable pressure chamber and operates said fluid displacement means; a control valve for controlling pressure in the variable pressure chamber of the booster unit comprising, a valve housing, a vacuum valve supported on its outer periphery in said housing by a flexible diaphragm, the inner periphery of said vacuum valve having an annular sleeve portion extending to engage a valve seat member, said valve seat member including diaphragm means supporting the same in said housing, said valve seat member and said vacuum valve forming a vacuum chamber in the valve housing of said valve means, an air valve forming with said valve seat member and the diaphragm supporting the same, an air chamber in communication with the atmosphere, a modulated air chamber formed by the said vacuum valve diaphragm said vacuum valve said air valve and said valve seat member, said modulated air chamber being adapted for communication with the variable pressure chamber in the booster unit, an auxiliary modulated air chamber formed by said valve seat member and the diaphragm supporting the same and a wall of said housing, said auxiliary modulated air chamber having communication with the modulated air chamber through said opening means in said valve seat member and providing a reaction force means together with said modulated air chamber whereby the pressurization in said modulated air chambers provides a reaction force against said vacuum valve diaphragm said vacuum valve and said valve seat member in direct response to the degree of pressurization in said modulated air chambers for transmission through said control valve.

2. In a brake booster unit having a power operated hydraulic fluid displacement means for brake actuation connected with a power wall in said power unit that divides the interior of said booster unit into a generally constant pressure chamber and a variable pressure chamber and operates said fluid displacement means; a control valve for controlling pressure in the variable pressure chamber of the booster unit comprising, a valve housing, a vacuum valve suspended on its outer periphery by a diaphragm sealed in said valve housing, the inner periphery of said vacuum valve having a sleeved portion, an air valve formed by said valve housing concentric with said vacuum valve and having a cylindrical opening slidably supporting the sleeved portion of said vacuum valve to provide alignment between said air valve and said vacuum valve, a valve seat member suspended on its outer periphery by a second diaphragm sealed to said valve housing means biasing said valve seat member normally to a contacting position with said air valve, said vacuum valve normally biased in spaced relation to said valve seat member by a spring, said vacuum valve diaphragm said vacuum valve and said valve seat member forming a vacuum chamber in communication with a source of vacuum, said air valve and said valve seat member together with said second diaphragm forming an air chamber in communication with the atmosphere, said vacuum valve diaphragm said vacuum valve and said valve seat member forming a modulated air chamber for communication with a variable pressure chamber in a booster unit, an auxiliary modulated air chamber formed by said valve seat member and the diaphragm supporting the same and a wall of said housing, a plurality of passages connecting said modulated air chamber with said auxiliary modulated air chamber to provide an equalization of pressure on both sides of said valve seat member irrespective of the position of said valves relative to said valve seat member, said vacuum valve diaphragm said vacuum valve and said valve seat member forming a reaction means for transmitting a reaction force through said valve in direct relation to the pressurization in said modulated air chambers.

3. In a brake booster unit having a power operated hydraulic fluid displacement means for brake actuation connected with a power wall in said power unit that divides the interior of said booster unit into a generally constant pressure chamber and a variable pressure chamber and operates said fluid displacement means; a control valve for controlling pressure in the variable pressure chamber of the booster unit comprising, a valve housing, a vacuum valve suspended on its outer periphery by a flexible diaphragm sealed on its outer periphery to said valve housing, an inner periphery of said vacuum valve having a sleeved portion for alignment with an air valve, an air valve formed by an annular extension of said valve housing having a portion slidably receiving said vacuum valve, a rigid valve seat disc member having concentric radially spaced surfaces forming an air valve seat and a vacuum valve seat biased to a normally contacting position with the said air valve, biasing means normally biasing said vacuum valve in spaced relation to the vacuum valve seat on said valve seat member, said vacuum valve diaphragm said vacuum valve and said valve seat member forming a reaction means for transmitting a reaction force through said control valve, said air valve said vacuum valve diaphragm and said vacuum valve forming a modulated air chamber for communication with a variable pressure chamber in said booster unit, said valve seat member suspended on its outer periphery by a valve seat diaphragm, said valve seat diaphragm sealed on its outer periphery to the valve housing, a plurality of axial passages extending through said valve seat member placing the modulated air chamber in communication with an auxiliary modulated air chamber on the opposite side of said valve seat member thereby providing equalization of pressure in said modulated air chamber and said auxiliary modulated air chamber as the pressure within the modulated air chamber varies effective on said valve seat member said valve seat diaphragm said vacuum valve and said vacuum valve diaphragm for transmitting reaction force thereby through the control valve.

References Cited in the file of this patent

UNITED STATES PATENTS

| | | |
|---|---|---|
| 2,805,647 | Ingres | Sept. 10, 1957 |
| 2,853,977 | Sadler | Sept. 30, 1958 |
| 2,872,905 | Chouings | Feb. 10, 1959 |
| 2,878,647 | Schultz | Mar. 24, 1959 |
| 2,910,051 | Hupp | Oct. 27, 1959 |